United States Patent
Maruyama

[19]

[11] Patent Number: 6,065,517
[45] Date of Patent: May 23, 2000

[54] PNEUMATIC RADIAL TIRE FOR HEAVY DUTY

[75] Inventor: Hirokatsu Maruyama, Hiratsuka, Japan

[73] Assignee: The Yokohama Rubber Co., Ltd., Tokyo, Japan

[21] Appl. No.: 09/005,190

[22] Filed: Jan. 9, 1998

[30]  Foreign Application Priority Data

Jan. 22, 1997 [JP] Japan .................................. 9-009541
Jan. 22, 1997 [JP] Japan .................................. 9-009543

[51] Int. Cl.[7] .......................... B60C 11/11; B60C 11/12; B60C 11/13; B60C 115/00
[52] U.S. Cl. ............................... 152/209.28; 152/209.24; 152/902; 152/DIG. 3
[58] Field of Search .......................... 152/209 R, 209 D, 152/DIG. 3, 209.18, 209.24, 209.28, 902

[56]  References Cited

U.S. PATENT DOCUMENTS

| D. 384,311 | 9/1997 | Maruyama et al. ................... D12/147 |
| 4,832,099 | 5/1989 | Matsumoto . |
| 5,044,414 | 9/1991 | Ushikubo . |
| 5,127,455 | 7/1992 | Remick . |
| 5,421,391 | 6/1995 | Himuro . |
| 5,580,404 | 12/1996 | Hitzky . |

FOREIGN PATENT DOCUMENTS

| 3909728 | 10/1989 | Germany ........................ 152/209.28 |
| 60-45404 | 3/1985 | Japan . |
| 2-102802 | 4/1990 | Japan . |
| 7-215013 | 8/1995 | Japan . |

*Primary Examiner*—Steven D. Maki
*Attorney, Agent, or Firm*—Arent Fox Kintner Plotkin & Kahn, PLLC

[57]  ABSTRACT

A heavy duty pneumatic radial tire having sub grooves provided on a tread surface which has a center main groove and two outer main grooves. The sub grooves extend in the tire width direction and together with the main grooves, divisionally form two block rows composed of a plurality of blocks. The sub grooves are inclined in a direction opposite to the tire rotating direction from the center main groove toward the outer main grooves. The inclination angle of the sub grooves is gradually and continuously reduced from a first inclination angle measured at the center main groove to a second inclination angle measured at the outer main groove. The first inclination angle is set in the range from 70 to 90° while the second inclination angle is set in the range of greater than 30° and less than the first inclination angle. Further, notched grooves can be provided dividing the shoulder areas of the tread surface into a plurality of blocks. The notched grooves can be inclined in a direction opposite to the tire rotating direction.

6 Claims, 4 Drawing Sheets

FIG. 6 CONVENTIONAL
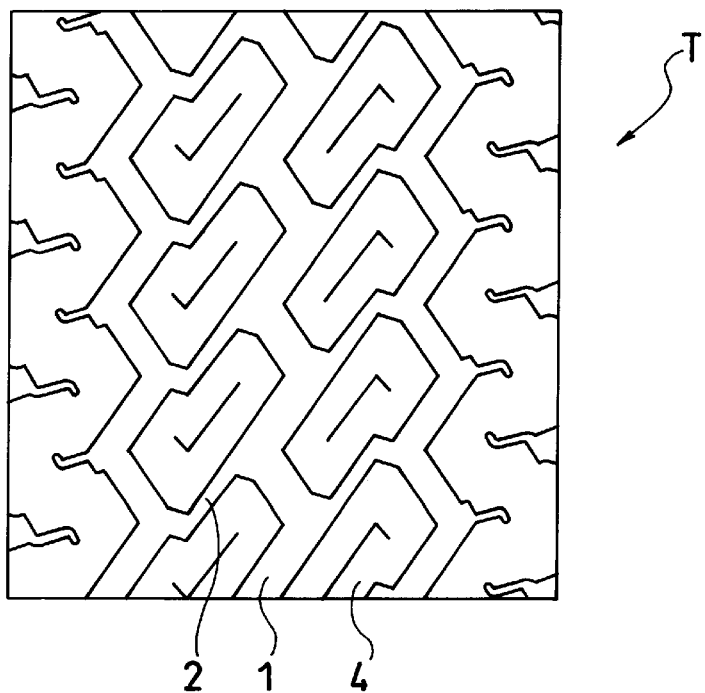

PNEUMATIC RADIAL TIRE FOR HEAVY DUTY

BACKGROUND OF THE INVENTION

The present invention relates to a heavy duty pneumatic radial tire having a block-based tread pattern, and more particularly to a heavy duty pneumatic radial tire adapted to suppress an occurrence of heel-and-toe wear without substantially reducing a tire performance such as a wet traction performance and a drainage performance.

Some heavy duty pneumatic radial tires have a block-based tread pattern. This block-based tread pattern has a plurality of rectangular blocks formed by a plurality of main grooves extending in a tire circumferential direction and a plurality of sub grooves extending in a tire width direction, whereby a desired wet traction performance and a desired drainage performance are obtained. In the heavy duty pneumatic radial tire, it is also generally assumed that a tire rotation is carried out. Thus, a non-directional tread pattern available for a rotation in both the directions has been a mainstream.

However, in the case of the heavy duty pneumatic radial tire having the block-based tread pattern, a contact pressure loaded to the individual blocks is higher. Therefore, since an amount of block deformation is larger at the time of contacting, heel-and-toe wear is disadvantageously prone to occur. On the other hand, if the block is enlarged in order to suppress the occurrence of heel-and-toe wear, a groove area becomes relatively small. This causes a problem in that the wet traction performance and drainage performance are reduced.

SUMMARY OF THE INVENTION

It is an object of the present invention to provide a heavy duty pneumatic radial tire capable of suppressing an occurrence of heel-and-toe wear without substantially reducing a tire performance such as a wet traction performance and a drainage performance.

In order to achieve the above object, according to a first aspect of the present invention, a heavy duty pneumatic radial tire comprises a tread pattern in which at least three main grooves and a plurality of sub grooves are provided on a tread surface, at least the three main grooves including a center main groove which extends in a tire circumferential direction and two outer main grooves which extends along both outer sides of the center main groove and the plurality of sub grooves extending in a tire width direction, the main grooves and the sub grooves divisionally form two block rows composed of a plurality of blocks at least in the center area, and a tire rotating direction is specified in one direction, wherein the sub grooves are inclined in a direction opposite to the tire rotating direction from the center main groove toward the outer main grooves, an inclination angle of the sub grooves with respect to the tire circumferential direction is gradually reduced from the center main groove toward the outer main grooves, the inclination angle $\theta_0$ measured on the center main groove in the direction opposite to the tire rotating direction is set in the range of $70° \leq \theta_0 \leq 90°$, the inclination angle $\theta_1$ measured on the outer main grooves in the direction opposite to the tire rotating direction is set in the range of $30° \leq \theta_0 < \theta_0$, and an angle $\alpha$ of a leading edge wall surface of the block with respect to a tire radiating direction is larger than an angle $\beta$ of a trailing edge wall surface.

In such a manner, the inclination angle of the sub grooves with respect to the tire circumferential direction is gradually reduced from the center main groove toward the outer main grooves within the above-described range, thereby allowing stiffness to be ensured at the leading edge end of the block. Also increased is an overlapping amount in the tire width direction of the blocks located adjacent to each other with the sub groove therebetween, whereby an interactive assistance of the blocks allows a contact pressure to be evenly dispersed. Furthermore, the angle $\alpha$ of the leading edge wall surface of the block is larger than the angle $\beta$ of the trailing edge wall surface, whereby it is possible to effectively suppress a behavior at the leading edge end of the blocks at the time of contacting. Therefore, the occurrence of heel-and-toe wear can be suppressed.

As described above, the strengthening of block stiffness, the dispersion of contact pressure and the suppression of block behavior are carried out at the same time, thereby suppressing the occurrence of heel-and-toe wear. Therefore, it is not necessary to enlarge the block in order to improve uneven wear resistance. Moreover, the tread pattern has directivity and the angle $\alpha$ of the leading edge wall surface of the block is selectively increased, while it is not necessary to increase the angle $\beta$ of the trailing edge wall surface. Accordingly, the wet traction performance is not substantially reduced.

In order to achieve the above object, according to a second aspect of the present invention, a heavy duty pneumatic radial tire comprises a tread pattern in which at least three main grooves, a plurality of sub grooves and notched grooves are provided on a tread surface, at least the three main grooves including a center main groove which extends in a tire circumferential direction and two outer main grooves which extends along both outer sides of the center main groove, the plurality of sub grooves extending in a tire width direction and the notched grooves whose width being narrower than the width of the sub grooves, the main grooves and the sub grooves divisionally form two block rows composed of a plurality of blocks in the center area, the main grooves and the notched grooves divisionally form block rows composed of a plurality of blocks in the right and left shoulder areas, respectively, and a tire rotating direction is specified in one direction, on each side of the tire, and notched grooves communicating directly with an outer main groove wherein at said outer main groove said notched grooves each have a width being narrower than the width of said sub-grooves, wherein the sub grooves are inclined in the direction opposite to the tire rotating direction from the center main groove toward the outer main grooves, an inclination angle of the sub grooves with respect to the tire circumferential direction is gradually reduced from the center main groove toward the outer main grooves, the inclination angle $\theta_0$ measured on the center main groove in the direction opposite to the tire rotating direction is set in the range of $70° \leq \theta_0 \leq 90°$, the inclination angle $\theta_1$ measured on the outer main grooves in the direction opposite to the tire rotating direction is set in the range of $30° \leq \theta_1 < \theta_0$, the notched grooves are inclined in the direction opposite to the tire rotating direction from the outer main grooves toward shoulder edges, an inclination angle of the notched grooves with respect to the tire circumferential direction is gradually increased from the outer main grooves toward the shoulder edges, the inclination angle $\theta_2$ measured on the outer main grooves in the direction opposite to the tire rotating direction is set in the range of $20° \leq \theta_2 \leq 50°$, and the inclination angle $\theta_3$ measured on the shoulder edges in the direction opposite to the tire rotating direction is set in the range of $30° < \theta_3 < 90°$.

In such a manner, the inclination angle of the sub grooves with respect to the tire circumferential direction is gradually reduced from the center main groove toward the outer main grooves within the above-mentioned range. The sub grooves are formed to be circular-arc so that they may be convex in the tire rotating direction, thereby allowing stiffness to be ensured at the leading edge end of the block in the center area. Also increased is the overlapping amount in the tire width direction of the blocks located adjacent to each other with the sub groove therebetween, whereby the interactive assistance of the blocks allows the contact pressure to be evenly dispersed. Since this suppresses the deformation of blocks, it is possible to suppress the heel-and-toe wear occurring in the block rows in the center area.

The inclination angle of the notched grooves with respect to the tire circumferential direction is gradually increased from the outer main grooves toward the shoulder edges within the above-described range. The notched grooves are formed to be circular-arc so that they may be convex in the direction opposite to the tire rotating direction, thereby allowing stiffness to be ensured at the trailing edge end of the block in the shoulder area. Also increased is the overlapping amount in the tire width direction of the blocks located adjacent to each other with the groove therebetween, whereby the interactive assistance of the blocks allows the contact pressure to be evenly dispersed. Since this suppresses the deformation of blocks, it is possible to suppress the heel-and-toe wear occurring in the block rows in the shoulder area.

Furthermore, although the notched grooves are narrower than the sub grooves, the notched grooves are formed to be circular-arc. The total length of the circular-arc groove is therefore longer than that of a straight one, thereby ensuring a larger groove volume. Accordingly, the reduction of drainage performance can be minimized.

For a more complete understanding of the present invention and the advantages thereof, reference is now made to the following description taken in conjunction with the accompanying drawings.

BRIEF DESCRIPTION OF THE DRAWINGS

FIG. 6 is a plan view showing a tread pattern of the conventional heavy duty pneumatic radial tire.

DETAILED DESCRIPTION OF THE PREFERRED EMBODIMENTS

Figure 1:
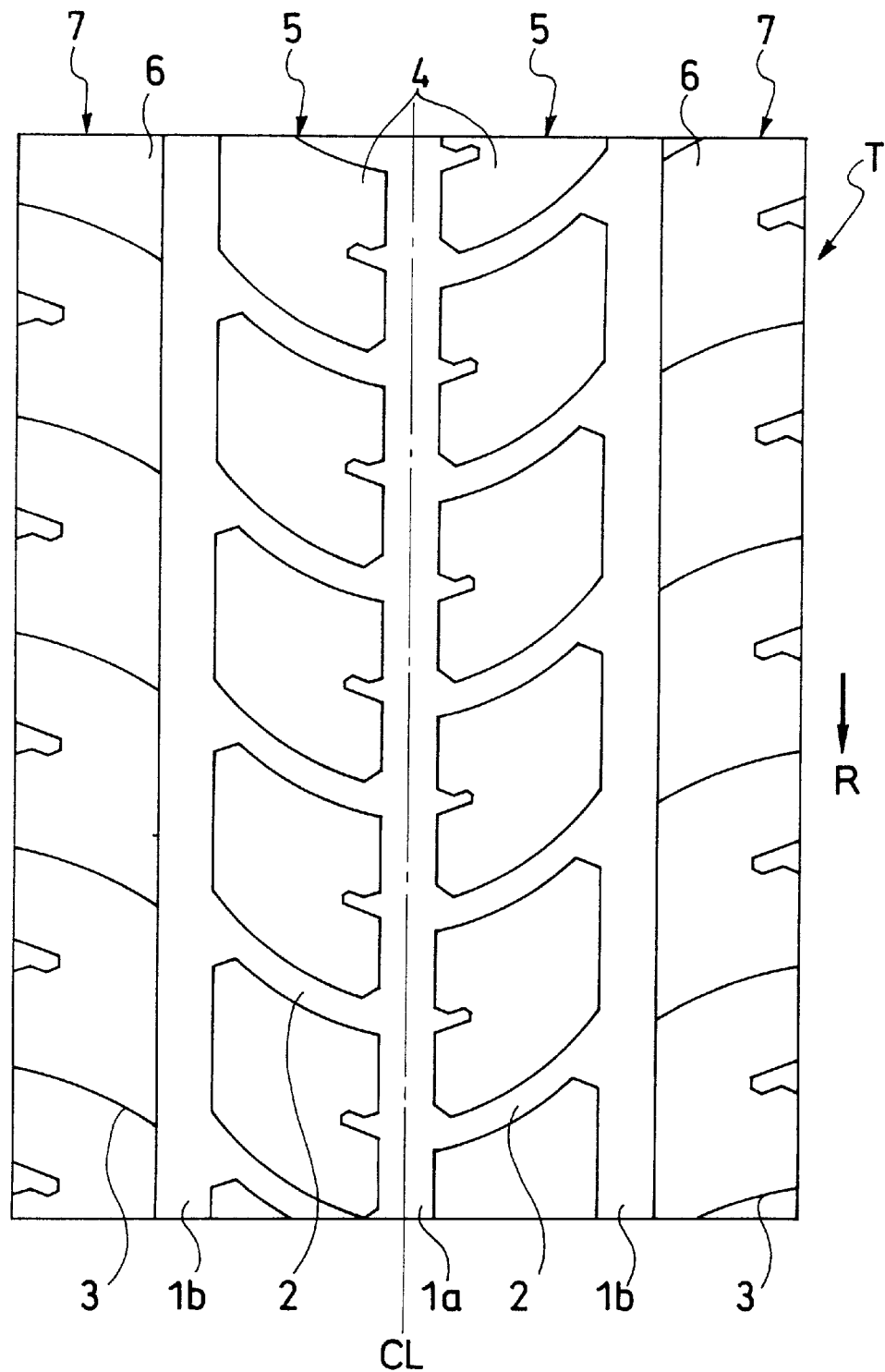
FIG. 1 is a plan view showing a tread pattern of a heavy duty pneumatic radial tire of the present invention.

FIG. 1 shows a tread pattern of a heavy duty pneumatic radial tire of the present invention. This tread pattern is a directional pattern so that a direction of an arrow R may be specified as a tire rotating direction. Hereinafter, the direction opposite to the tire rotating direction means the direction opposite to the tire rotating direction R.

Referring to FIG. 1, on a tread surface T, arranged are a center main groove 1a extending in a tire circumferential direction located on a tire equator CL and two outer main grooves 1b extending along both the outer sides of the center main groove 1a. Two block rows 5 and block rows 7 are formed by these main grooves 1a and 1b in the center area and in both the shoulder areas, respectively. A plurality of sub grooves 2 are arranged between the center main groove 1a and both the right and left outer main grooves 1b so that the sub grooves 2 may cross the block rows 5 in a tire width direction. These sub grooves 2 are arranged so that they may be inclined from the center main groove 1a on the tire equator CL toward the outer main grooves 1b in the direction opposite to the tire rotating direction. The block rows 5 are divided into a plurality of blocks 4 by these plural sub grooves 2. In FIG. 1, although the sub grooves 2 are arranged so that they may offset each other in the tire circumferential direction on both the sides of the tire equator CL, the right and left sub grooves 2 are not always required to offset each other.

On the outer side of the outer main grooves 1b, also arranged are a plurality of notched grooves 3 whose width is narrower than the width of the sub grooves 2 so that they may cross the block rows 7 in the tire width direction. Like the sub grooves 2, these notched grooves 3 are also arranged so that they may be inclined from the outer main grooves 1b toward shoulder edges in the direction opposite to the tire rotating direction. The block rows 7 are divided into a plurality of blocks 6 by these plural notched grooves 3. In the shoulder areas, the block rows 7 may be replaced by ribs.

Figure 2:
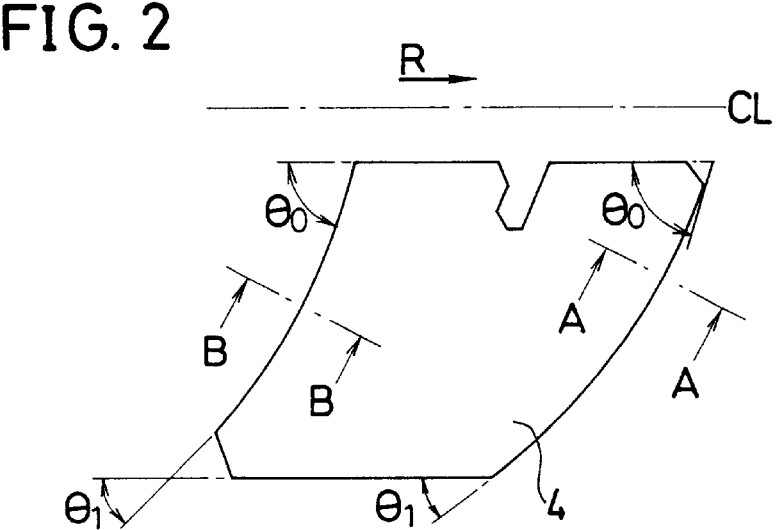
FIG. 2 is a partially enlarged plan view showing a block in a center area of the heavy duty pneumatic radial tire according to a first embodiment of the present invention.

In a first embodiment of the present invention, the sub grooves 2 are inclined from the center main groove 1a passing on the tire equator CL toward the right and left outer main grooves 1b in the direction opposite to the tire rotating direction. The sub grooves 2 are also arranged so that the inclination angle thereof may be gradually reduced from the center main groove 1a toward the outer main grooves 1b as shown in FIG. 2. That is, the sub grooves 2 are curved to be circular-arc so that they may be convex in the tire rotating direction. Furthermore, the inclination angle $\theta_0$ of the sub grooves 2 measured on the center main groove 1a in the direction opposite to the tire rotating direction is set in the range of $70° \leq \theta_0 \leq 90°$. The inclination angle $\theta_1$ of the sub grooves 2 similarly measured on the outer main grooves 1b in the direction opposite to the tire rotating direction is set in the range of $30° \leq \theta_1 < \theta_0$.

In such a manner, the inclination direction and inclination angle of the sub grooves 2 are set, thereby allowing stiffness to be ensured at a leading edge end of the blocks 4. Also increased is an overlapping amount in the tire width direction of the blocks 4 located adjacent to each other with the sub groove therebetween, whereby an interactive assistance of the blocks 4 allows a contact pressure to be evenly dispersed. It is therefore possible to improve uneven wear resistance to heel-and-toe wear.

If the inclination angle $\theta_0$ of the sub grooves 2 is less than 70° near the tire equator CL, the stiffness is insufficient at the leading edge end of the blocks 4. Therefore, an effect of improving the uneven wear resistance cannot be obtained. On the other hand, if the inclination angle $\theta_1$ of the sub grooves 2 is less than 30° on the outer side of the tire, the stiffness is insufficient at the trailing edge end of the blocks 4. This causes the heel-and-toe wear at the trailing edge. If the inclination angle $\theta_1$ is set to be equal to or more than the inclination angle $\theta_0$, it is not possible to obtain the effect of dispersing the contact pressure by increasing the overlapping amount in the tire width direction of the blocks 4 located adjacent to each other with the sub groove 2 therebetween.

Preferably, an angular difference $(\theta_0-\theta_1)$ between the inclination angle $\theta_0$ and inclination angle $\theta_1$ of the sub grooves 2 is set in the range from 20° to 50°. If the angular difference $(\theta_0-\theta_1)$ is less than 20°, it is not possible to obtain the effect of dispersing the contact pressure by increasing the overlapping amount in the tire width direction of the blocks 4 adjacent to each other with the sub groove 2 therebetween. Conversely, if the angular difference $(\theta_0-\theta_1)$ is more than 50°, the stiffness is insufficient at the trailing edge end of the block 4.

Figure 3:
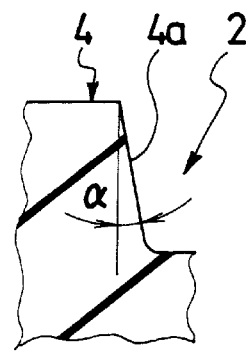
FIG. 3 is a cross sectional view taken on line A—A of FIG. 2.
Figure 4:
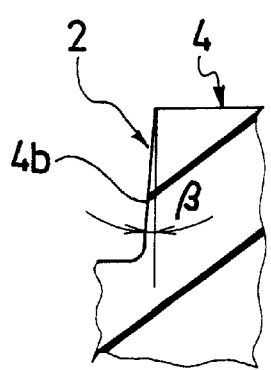
FIG. 4 is a cross sectional view taken on line B—B of FIG. 2.

As shown in FIGS. 3 and 4, a leading edge wall surface 4a and a trailing edge wall surface 4b of the block 4 formed in the center area have different inclination angles with respect to a tire radiating direction. An angle $\alpha$ of the leading edge wall surface 4a is set so that it may be larger than an angle $\beta$ of the trailing edge wall surface 4b. The angle $\alpha$ of the leading edge wall surface 4a is thus larger than the angle $\beta$ of the trailing edge wall surface 4b, whereby it is possible to suppress a behavior at the leading edge end of the block 4 at the time of contacting. At the time of braking, the blocks 4 are evenly worn all over the surface thereof in such a manner that the leading edge end keeps contacting with the ground. It is therefore possible to improve uneven wear resistance to heel-and-toe wear.

In the case of the above-described tread pattern, the inclination direction and inclination angles $\theta_0$, $\theta_1$ of the sub groove 2 are set, thereby allowing the heel-and-toe wear to be suppressed without extremely enlarging the block 4. A sufficient groove area can be thus ensured. The angle $\alpha$ of the leading edge wall surface of the block 4 is selectively increased, while the angle $\beta$ of the trailing edge wall surface is not required to increase. Therefore, a wet traction performance is not substantially reduced. Preferably, the angle $\alpha$ of the leading edge wall surface 4a of the block 4 is set so that it may be two to three times larger than the angle $\beta$ of the trailing edge wall surface 4b. If the angle $\alpha$ of the leading edge wall surface 4a is less than $2\beta$, it is not possible to obtain the effect of suppressing the behavior of the leading edge end of the block 4. On the contrary, if the angle $\alpha$ exceeds $3\beta$, the wet traction performance is reduced.

Next, the heavy duty pneumatic radial tire according to a second embodiment of the present invention will be described. Since the second embodiment has the same tread pattern as the first embodiment, the same reference numerals designate the same elements, and thus the detailed description is omitted.

Figure 5:
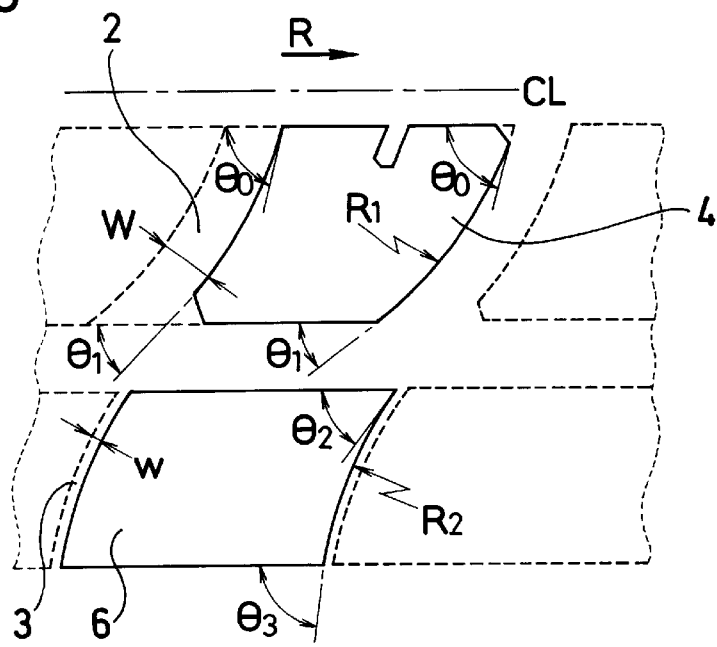
FIG. 5 is a partially enlarged plan view showing the blocks in the center area and shoulder area of the heavy duty pneumatic radial tire according to a second embodiment of the present invention.

In this embodiment, the sub grooves 2 are inclined from the center main groove 1a passing on the tire equator CL toward the right and left outer main grooves 1b in the direction opposite to the tire rotating direction. In addition, the inclination angle of the sub grooves 2 is gradually reduced from the center main groove 1a toward the outer main grooves 1b, as shown in FIG. 5. That is, the sub grooves 2 are curved in a circular-arc shape of a radius $R_1$ so that they may be convex in the tire rotating direction. Moreover, the inclination angle $\theta_0$ of the sub grooves 2 measured on the center main groove 1a in the direction opposite to the tire rotating direction is set in the range of $70° \leq \theta_0 \leq 90°$. The inclination angle $\theta_1$ of the sub grooves 2 similarly measured on the outer main grooves 1b in the direction opposite to the tire rotating direction is set in the range of $30° \leq \theta_1 < \theta_0$.

In such a manner, the inclination direction and inclination angle of the sub grooves 2 are set, thereby allowing the stiffness to be ensured at the leading edge end of the blocks 4 located in the center area. Also increased is the overlapping amount in the tire width direction of the blocks 4 located adjacent to each other with the sub groove therebetween, whereby the interactive assistance of the blocks 4 allows the contact pressure to be evenly dispersed. It is therefore possible to improve the uneven wear resistance to heel-and-toe wear.

If the inclination angle $\theta_0$ of the sub grooves 2 is less than 70° near the tire equator CL, the stiffness is insufficient at the leading edge end of the blocks 4. The effect of improving the uneven wear resistance cannot be obtained. On the other hand, if the inclination angle $\theta_1$ of the sub grooves 2 is less than 30° on the outer side of the tire, the stiffness is insufficient at the trailing edge end of the blocks 4. This causes the heel-and-toe wear at the trailing edge. If the inclination angle $\theta_1$ is equal to or more than the inclination angle $\theta_0$, it is not possible to obtain the effect of dispersing the contact pressure by increasing the overlapping amount in the tire width direction of the blocks 4 located adjacent to each other with the sub groove 2 therebetween.

Preferably, the angular difference $(\theta_0-\theta_1)$ between the inclination angle $\theta_0$ and the inclination angle $\theta_1$ of the sub grooves 2 is set in the range from 20° to 50°. If the angular difference $(\theta_0-\theta_1)$ is less than 20°, it is not possible to obtain the effect of dispersing the contact pressure by increasing the overlapping amount in the tire width direction of the blocks 4 located adjacent to each other with the sub greater than 50°, the stiffness is insufficient at the trailing edge end of the blocks 4.

On the other hand, the notched grooves 3 are inclined from the outer main grooves 1b near the tire equator CL toward the shoulder edges on both the outer sides in the direction opposite to the tire rotating direction. Moreover, the inclination angle of the notched grooves 3 is gradually increased from the outer main grooves 1b toward the shoulder edges, as shown in FIG. 5. That is, the notched grooves 3 are curved in a circular-arc shape of a radius $R_2$ so that they may be convex in the direction opposite to the tire rotating direction. In addition, an inclination angle $\theta_2$ of the notched grooves 3 measured on the outer main grooves 1b in the direction opposite to the tire rotating direction is set in the range of $20° \leq \theta_2 \leq 50°$. The inclination angle $\theta_3$ similarly measured on the shoulder edges in the direction opposite to the tire rotating direction is set in the range of $30° < \theta_2 < 90°$.

In such a manner, the inclination direction and the inclination angle of the notched grooves 3 are set, thereby allowing the stiffness to be ensured at the trailing edge end of the blocks 6 located in both the shoulder areas. Also increased is the overlapping amount in the tire width direction of the blocks 6 located adjacent to each other with the notched groove 3 therebetween, whereby the interactive assistance of the blocks 6 allows the contact pressure to be evenly dispersed. It is therefore possible to improve the uneven wear resistance to heel-and-toe wear.

If the inclination angle $\theta_2$ of the notched grooves 3 is less than 20° near the tire equator CL, the stiffness is insufficient at the leading edge end of the blocks 6. This causes the heel-and-toe wear at the leading edge. Conversely, if the inclination angle $\theta_2$ exceeds 50°, it is not possible to obtain the effect of dispersing the contact pressure by increasing the overlapping amount in the tire width direction of the blocks 6 adjacent to each other with the notched groove 3 therebetween. On the other hand, if the inclination angle $\theta_3$ of the notched grooves 3 is equal to or less than 30° on the outer side of the tire, the stiffness is insufficient at the trailing edge end of the blocks 6. It is not possible to obtain the effect of improving the uneven wear resistance to heel-and-toe wear.

Preferably, the angular difference ($\theta_3-\theta_2$) between the inclination angle $\theta_2$ and the inclination angle $\theta_3$ of the notched grooves 3 is set in the range from 10° to 40°. If the angular difference ($\theta_3-\theta_2$) is less than 10°, it is not possible to obtain the effect of dispersing the contact pressure by increasing the overlapping amount in the tire width direction of the blocks 6 adjacent to each other with the notched groove 3 therebetween. Conversely, if the angular difference ($\theta_3-\theta_2$) is greater than 40°, the stiffness is insufficient at the trailing edge end of the blocks 6.

The sub grooves 2 may have a width of, for example, 3–10 mm. The notched grooves 3 may have a width of, for example, 0.5–3 mm. The width of the notched grooves 3 is narrower than that of the sub grooves 2. However, the notched grooves 3 are formed to be circular-arc, whereby the total length of the circular-arc groove is therefore longer than that of a straight one. This allows a larger groove volume to be ensured. Accordingly, the reduction of drainage performance can be minimized.

Preferably, a relationship between a width w of the notched grooves 3 and a width W of the sub grooves 2 is defined to be 0.1 W≦w≦0.5 W. The width w of the notched grooves 3 is set in the aforementioned range, thereby making the blocks 6 located adjacent to each other much closer. This allows the interactive assistance to be obtained in the block rows 7. If the width w of the notched grooves 3 is less than 0.1 W, the drainage performance is insufficient. Conversely, if the width w is more than 0.5 W, the effect of improving the uneven wear resistance to heel-and-toe wear cannot be obtained.

Although the preferred embodiments of the present invention have been described above, it should be understood that various changes, substitutions and alternations can be made therein without departing from the spirit and scope of the present invention as defined by the appended claims.

Embodiments

Assuming that a tire size was 11R22.5, we made a conventional tire 1 having the tread pattern shown in FIG. 5, comparison tires 1, 2 and tires 1 through 5 of the present invention having the tread pattern shown in FIG. 1 in which the relationship between the angle $\alpha$ of the leading edge wall surface 4a and the angle $\beta$ of the trailing edge wall surface 4b of the block 4 was set to be $\alpha=2\beta$, the inclination angle $\theta_0$ of the sub groove 2 was set to be 80° and the inclination angle $\theta_1$ alone was varied. In the conventional tire 1, it should be noted that the sub groove 2 was straightly extended by setting the angle to 60° with respect to the tire circumferential direction.

For these test tires, the uneven wear resistance was evaluated by the following method. The result is shown in Table 1.

Uneven wear resistance:

Each test tire was attached to a trailer at an air pressure of 700 kPA. After the running of 10,000 km, an amount of heel-and-toe wear occurrence was measured. The evaluation result is represented by an index, where the index is determined by defining a reciprocal of measurement value of the conventional tire 1 as 100. As this index value is larger, the uneven wear resistance is more excellent.

TABLE 1

| | Comparison Tire 1 | Tire 1 of the invention | Tire 2 of the invention | Tire 3 of the invention | Tire 4 of the invention | Tire 5 of the invention | Comparison Tire 2 |
|---|---|---|---|---|---|---|---|
| $\theta_1$ | 20° | 30° | 40° | 50° | 60° | 70° | 80° |
| Uneven wear resistance | 110 | 110 | 120 | 120 | 110 | 105 | 100 |

As can be seen from Table 1, in the case of the tires 1 through 5 of the present invention in which the inclination angle $\theta_0$ of the sub groove 2 was set to be 80° while the inclination angle $\theta_1$ was set to range from 30° to 70°, the uneven wear resistance of the tires 1 through 5 was superior to that of the conventional tire 1. On the other hand, in the case of the comparison tires 1 and 2 having the inclination angle $\theta_1$ of the sub groove 2 of 20° and 80°, respectively, the improvement of uneven wear resistance was not observed compared to the conventional tire 1.

Next, assuming that the tire size was 11R22.5, we made comparison tires 3, 4 and tires 6 through 8 of the present invention having the tread pattern shown in FIG. 1 in which the relationship between the angle $\alpha$ of the leading edge wall surface 4a and the angle $\beta$ of the trailing edge wall surface 4b of the block 4 was set to be $\alpha=2\beta$, the inclination angle $\theta_1$ of the sub groove 2 was set to be 45° and the inclination angle $\theta_0$ alone was varied. For these test tires, the uneven wear resistance was evaluated by the above test method. The result is shown in Table 2.

TABLE 2

| | Comparison Tire 3 | Tire 6 of the invention | Tire 7 of the invention | Tire 8 of the invention | Comparison Tire 4 |
|---|---|---|---|---|---|
| $\theta_0$ | 60° | 70° | 80° | 90° | 100° |
| Uneven wear resistance | 100 | 110 | 120 | 120 | 110 |

As can be seen from Table 2, in the case of the tires 6 through 8 of the present invention in which the inclination angle $\theta_1$ of the sub groove 2 was set to be 45° while the inclination angle $\theta_0$ was set to range from 70° to 90°, the uneven wear resistance of the tires 6 through 8 was superior to that of the conventional tire 1. On the other hand, in the case of the comparison tires 3 and 4 having the inclination angle $\theta_1$ of the sub groove 2 of 60° and 100°, respectively, the improvement of uneven wear resistance was not observed compared to the conventional tire 1.

Next, assuming that the tire size was 11R22.5, we made a comparison tire 5 and tires 9 through 11 of the present invention having the tread pattern shown in FIG. 1 in which the inclination angle $\theta_0$ of the sub groove 2 was set to be 80° and the inclination angle $\theta_1$ was set to be 45° and the relationship alone between the angle $\alpha$ of the leading edge wall surface 4a and the angle $\beta$ of the trailing edge wall surface 4b of the block 4 was varied. For these test tires, the uneven wear resistance was evaluated by the above test method. The wet traction performance was also evaluated by the test method described below. The result is shown in Table 3.

Wet traction performance:

Each test tire was attached to the trailer at an air pressure of 700 kPA. A traction force was measured on a wet road surface. The evaluation result is represented by an index, where the index is determined by defining the measurement value of the conventional tire 1 as 100. As this index value is larger, the wet traction performance is more excellent.

TABLE 3

|  | Comparison Tire 5 | Tire 9 of the invention | Tire 10 of the invention | Tire 11 of the invention |
|---|---|---|---|---|
| α | β | 2β | 3β | 4β |
| Uneven wear resistance | 105 | 125 | 125 | 130 |
| wet traction performance | 100 | 99 | 98 | 96 |

As can be seen from Table 3, in the case of the tires 9 and 10 of the present invention of α=2β, 3β, the uneven wear resistance could be further improved without substantially reducing the wet traction performance compared to the conventional tire 1.

Figure 7:
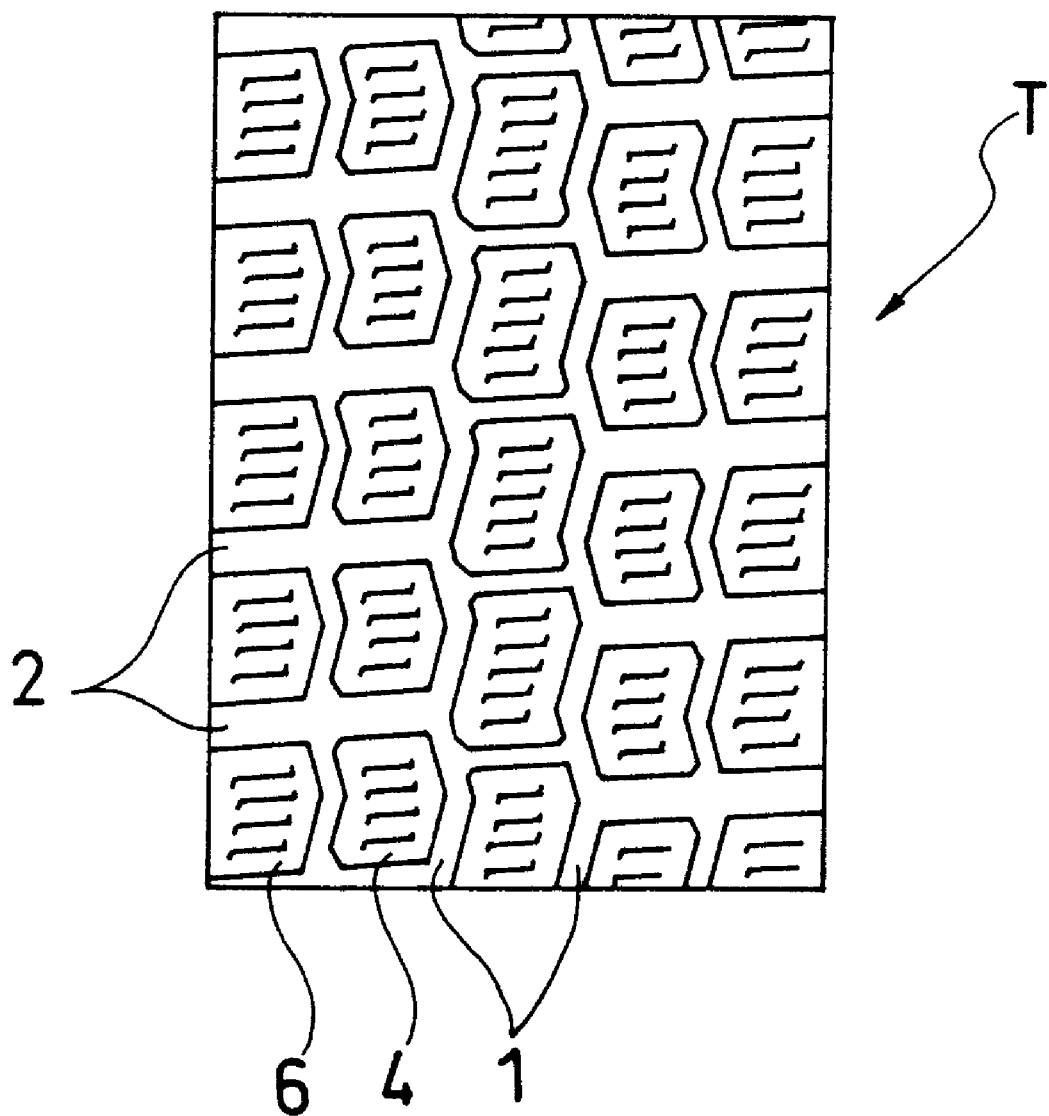
FIG. 7 is a plan view showing another tread pattern of the conventional heavy duty pneumatic radial tire.

Next, assuming that the tire size was 11R22.5, we made a conventional tire 2 having the tread pattern shown in FIG. 7, comparison tires 6, 7 and tires 12 through 15 of the present invention having the tread pattern shown in FIG. 1 in which the inclination angle $\theta_0$ of the sub groove 2 was set to be 80° and the inclination angle $\theta_1$ was set to be 45°, the inclination angle $\theta_2$ of the notched groove 3 was set to be 40° and the inclination angle $\theta_3$ alone was varied. In the conventional tire 2, it should be noted that the notched groove 3 was straightly extended by setting the angle to 80° with respect to the tire circumferential direction.

For these test tires, the uneven wear resistance was evaluated by the above test method. The result is shown in Table 4. The evaluation result is represented by an index, where the index is determined by defining the reciprocal of measurement value of the conventional tire 2 as 100.

TABLE 4

|  | Comparison Tire 6 | Tire 12 of the invention | Tire 13 of the invention | Tire 14 of the invention | Tire 15 of the invention | Comparison Tire 7 |
|---|---|---|---|---|---|---|
| $\theta_3$ | 40° | 50° | 60° | 70° | 80° | 90° |
| Uneven wear resistance | 100 | 105 | 110 | 120 | 110 | 100 |

As can be seen Table 4, in the case of the tires 12 through 15 of the present invention in which the inclination angle $\theta_2$ of the notched groove 3 was set to be 40° while the inclination angle $\theta_3$ was set to range from 50° to 80°, the uneven wear resistance of the tires 12 through 15 was superior to that of the conventional tire 2. On the other hand, in the case of the comparison tires 6 and 7 having the inclination angle $\theta_3$ of the notched groove 3 of 40° and 90°, respectively, the improvement of uneven wear resistance was not observed compared to the conventional tire 2.

Next, assuming that the tire size was 11R22.5, we made comparison tires 8, 9 and tires 16 through 19 of the present invention having the tread pattern shown in FIG. 1 in which the inclination angle $\theta_0$ of the sub groove 2 was set to be 80° and the inclination angle $\theta_1$ was set to be 45°, the inclination angle $\theta_3$ of the notched groove 3 was set to be 70° and the inclination angle $\theta_2$ alone was varied. For these test tires, the uneven wear resistance was evaluated by the above test method. The result is shown in Table 5.

TABLE 5

|  | Comparison Tire 8 | Tire 16 of the invention | Tire 17 of the invention | Tire 18 of the invention | Tire 19 of the invention | Comparison Tire 9 |
|---|---|---|---|---|---|---|
| $\theta_2$ | 10° | 20° | 30° | 40° | 50° | 60° |
| Uneven wear resistance | 100 | 105 | 110 | 120 | 120 | 110 |

As can be seen Table 5, in the case of the tires 16 through 19 of the present invention in which the inclination angle $\theta_3$ of the notched groove 3 was set to be 70° while the inclination angle $\theta_2$ was set to range from 20° to 50°, the uneven wear resistance of the tires 16 through 19 was superior to that of the conventional tire 2. On the other hand, in the case of the comparison tire 8 having the inclination angle $\theta_2$ of the notched groove 3 of 10°, the improvement of uneven wear resistance was not observed compared to the conventional tire 2.

What is claimed is:

1. A heavy duty pneumatic radial tire comprising:
    a tread pattern in which at least three main grooves, a plurality of sub grooves and notched grooves are provided on a tread surface, said at least three main grooves including a center main groove which extends in a tire circumferential direction and two outer main grooves each of which extends in the tire circumferential direction, said center main groove being between said two outer main grooves, said plurality of sub grooves extending in a tire width direction, and said notched grooves each having a width being narrower than the width of said sub grooves, said main grooves and said sub grooves divisionally form two block rows composed of a plurality of blocks in a center area, said main grooves and said notched grooves divisionally form block rows composed of a plurality of blocks in right and left shoulder areas, respectively, and a tire rotating direction is specified in one direction, on each side of the tire, said notched grooves communicating directly with an outer main groove wherein at said outer main groove said notched grooves each have a width being narrower than the width of said sub-grooves,
    wherein said sub grooves are inclined in a direction opposite to the tire rotating direction from said center main groove toward said outer main grooves, an inclination angle of said sub grooves with respect to the tire circumferential direction is gradually and continuously reduced from an inclination angle $\theta_0$ measured at said center main groove to an inclination angle $\theta_1$ measured at an outer main groove, the inclination angle $\theta_0$ is set in a range of $70° \leq \theta_0 \leq 90°$, the inclination angle $\theta_1$ is set in a range of $30° \leq \theta_1 < \theta_0$, said notched grooves are inclined in the direction opposite to the tire rotating direction from said outer main grooves toward shoulder edges, an inclination angle of said notched grooves with respect to the tire circumferential direction is gradually increased from an inclination angle $\theta_2$ measured at an outer main groove to an inclination angle $\theta_3$ measured at a shoulder edge, the inclination angle $\theta_2$ is set in a range of $20° \leq \theta_2 \leq 50°$, and the inclination angle $\theta_3$ is set in a range of $30° < \theta_3 < 90°$.

2. The heavy duty pneumatic radial tire according to claim 1, wherein an angular difference $(\theta_0 - \theta_1)$ between the inclination angle $\theta_0$, and inclination angle $\theta_1$ of said sub grooves is set in a range from $20°$ to $50°$.

3. The heavy duty pneumatic radial tire according to claim 1, wherein an angular difference $(\theta_3 - \theta_2)$ between the inclination angle $\theta_2$ and inclination angle $\theta_3$ of said notched grooves is set in a range from $10°$ to $40°$.

4. The heavy duty pneumatic radial tire according to claim 1, wherein a relationship between a width w of said notched grooves and a width W of said sub grooves is defined to be $0.1W \leq w \leq 0.5W$.

5. The heavy duty pneumatic radial tire according to claim 1, wherein said sub grooves are curved to be circular-arc so that they are convex in the tire rotating direction.

6. The heavy duty pneumatic radial tire according to claim 1, wherein said notched grooves are curved to be circular-arc so that they are convex in the direction opposite to the tire rotating direction.

* * * * *